United States Patent [19]
Yang

[11] Patent Number: 5,663,768
[45] Date of Patent: Sep. 2, 1997

[54] MULTI-TELEVISION BROADCASTING SIGNAL RECEIVING APPARATUS AND CONTROL METHOD THEREOF

[75] Inventor: Jae-mo Yang, Suwon-city, Rep. of Korea

[73] Assignee: Samsung Electronics Co., Ltd., Kyungki-do, Rep. of Korea

[21] Appl. No.: 471,164

[22] Filed: Jun. 6, 1995

[30] Foreign Application Priority Data

Jun. 9, 1994 [KR] Rep. of Korea ............. 94-12940

[51] Int. Cl.⁶ ................................. H04N 5/46
[52] U.S. Cl. ................. 348/557; 348/555; 348/558
[58] Field of Search .................... 348/557, 558, 348/556, 555, 554, 553, 713, 643, 644, 645, 647, 648; H04N 5/46

[56] References Cited

U.S. PATENT DOCUMENTS 5,136,369  8/1992  Bohme et al. .............. 348/558
5,146,331  9/1992  Tsuchida .................... 348/556

FOREIGN PATENT DOCUMENTS 0314873  5/1989  European Pat. Off. ......... H04N 5/46
6078236  3/1994  Japan ............................. H04N 5/46

*Primary Examiner*—Michael H. Lee
*Attorney, Agent, or Firm*—Sughrue, Mion, Zinn, Macpeak & Seas

[57] ABSTRACT

A multi-television broadcasting signal receiving apparatus and method thereof are provided. In the apparatus, if aerially transmitted several television broadcasting signals are tuned and the tuned signal is inputted as an IF signal, a microcomputer outputs a different chrominance control signal according to the broadcasting system by using the input IF signal. A chrominance signal amplifying portion varies a color concentration of a detected signal according to the broadcasting system by the chrominance control signal output from the microcomputer so as to discriminate the broadcasting system. The color concentration is automatically corrected without the need of an extra correction circuit by correcting the color concentration of the broadcasting signal discriminated by a preprogrammed different gain according to the broadcasting system of the received signal. This effect can be applied to a television for receiving a plurality of broadcasting signals.

19 Claims, 4 Drawing Sheets

MULTI-TELEVISION BROADCASTING SIGNAL RECEIVING APPARATUS AND CONTROL METHOD THEREOF

BACKGROUND OF THE INVENTION

The present invention relates to a multi-television broadcasting signal receiving apparatus and a control method thereof. More particularly, the present invention relates to a multi-television broadcasting signal receiving apparatus and a control method for automatically adjusting the concentration of the color of a television signal to correspond to the broadcasting system of the television signal.

There are several types of commercialized television broadcasting systems for television signals. For example, one commercialized broadcasting system is a National Television System Committee (NTSC) system which was created based on recommendations from the American Television System Committee. Subsequently, other systems were developed which modified the NTSC system but maintained a majority of basic features of the NTSC system. For example, some of the modified systems are the Phase Alternating Line (PAL) system and the Sequential Color with Memory (SECAM) system.

Each of the systems mentioned above have their individual advantages and drawbacks. Moreover, the devices used to detect such broadcasting systems are also different from each other. For example, in the NTSC system, the frequency of the chrominance subcarrier is 3.58 MHz, and the frequency of the vertical synchronization signal (hereinafter referred to as a 'vertical frequency') is 60 Hz. In the PAL system, the chrominance subcarrier wave frequency is 4.43 MHz and the vertical frequency is 50 Hz. Finally, in the SECAM system, the frequencies of two of the chrominance subcarrier waves are 4.40625 MHz and 4.25 MHz, and the vertical frequency is 50 Hz.

Also, each broadcasting system is different with respect to the time at which video and audio signals are detected and with respect to the frequencies of the vertical sync signal and the chrominance subcarrier. In particular, the chrominance level of a broadcasting signal of the PAL or SECAM system is relatively strong when compared to a broadcasting signal of the NTSC system.

Due to the different characteristics of the NTSC, PAL, and SECAM systems, the chrominance level of a video signal varies according to the broadcasting system of the signal. Therefore, a multi-television having the capability of receiving broadcasting signals from each of the above described broadcasting system needs to adjust the chrominance concentration of a video signal in accordance with the broadcasting system of the signal.

An example of a multi-television which has the capability of adjusting the chrominance concentration of a received signal according to the broadcasting systems of the signal is shown in FIG. 1. As illustrated in the figure, the broadcasting signal of an aerially transmitted radio frequency (RF) is received by a tuner 10 via an antenna. Subsequently, the tuner 10 outputs a corresponding intermediate frequency (IF) by mixing the received broadcasting signal with an oscillating frequency signal. The oscillating frequency signal is supplied from a local oscillator (not shown) in accordance with a control signal supplied from a microcomputer 12.

The IF signal is then output to an IF signal processing portion 14 which amplifies the IF signal, produces a corresponding wave form, and outputs the wave form to an NTSC detecting portion 16 and a PAL detecting portion 18. Furthermore, the IF signal processing portion 14 outputs the IF signal to the microcomputer 12.

Since the chrominance level of an NTSC broadcasting signal is lower than the chrominance level of a PAL broadcasting signal, the broadcasting signal output from the NTSC detecting portion 16 is input to a chrominance signal level correction portion 20. As a result, the chrominance level of the NTSC signal is adjusted such that the resultant video image displayed on a picture tube (not shown) has the proper chrominance concentration.

The corrected NTSC broadcasting signal output from chrominance signal level correction portion 20 and the PAL broadcasting signal output from PAL detecting portion 18 are respectively supplied to first and second input terminals of a switch 22. The switch 22 selectively inputs either the corrected NTSC broadcasting signal or the PAL broadcasting signal based on a discrimination control signal output from the microcomputer 12. The microcomputer 12 determines whether the received broadcasting signal is an NTSC signal or the PAL signal according to the frequency of the vertical sync signal of the IF signal received from the IF signal processing portion 14. Therefore, since the vertical sync signal of an NTSC signal is different than that of a PAL signal, the microcomputer 12 is able to determine whether the broadcasting signal is an NTSC or a PAL signal and generates a corresponding discrimination control signal.

Accordingly, the switch 22 selectively outputs either the corrected NTSC signal or the PAL signal based on the discrimination control signal. The output of the switch 22 is then input by a chrominance signal amplifying portion 24 which amplifies the broadcasting signal to a level suitable for displaying the signal. In particular, the broadcasting signal is amplified based on a predetermined gain which is established based on a control signal from the microcomputer 12. Subsequently, the amplified broadcasting signal is output to the picture tube (not shown). Furthermore, even though the chrominance signal is amplified by a predetermined amount, one can also adjust the chrominance level of the signal to a desired chrominance concentration by inputting an appropriate command via a key input portion 26.

As described hereinabove, the apparatus shown in FIG. 1 comprises both a chrominance signal level correction portion and a chrominance signal amplifying portion to properly display both an NTSC broadcasting signal and a PAL broadcasting signal. Accordingly, the cost of manufacturing such apparatus is relatively high since both a correction portion 20 and an amplifying portion 24 are required. Also, the design of the correction circuit is complicated, and the number of hardware components for the apparatus is relatively high.

SUMMARY OF THE INVENTION

To overcome the above problems, it is an object of a present invention to provide a multi-television broadcasting signal receiving apparatus and a control method capable of automatically correcting a chrominance signal of a broadcasting system without the need of an extra correction circuit. For example, the chrominance signal of an NTSC broadcasting signal, which has a chrominance level that is lower than other broadcasting systems, may be corrected by a chrominance control signal which contains preprogrammed correction data.

To achieve the above object of the present invention, the multi-television broadcasting signal receiving apparatus, which processes a tuned signal as an intermediate frequency (IF) signal and determines a broadcasting system of the IF signal based on the IF signal, includes: a plurality of detecting means for detecting the IF signal by the broadcasting system; control means for determining the broadcasting system of the IF signal by using at least one of a chrominance subcarrier and a vertical sync signal contained in the IF signal, for outputting a discrimination control signal based on the at least one of the chrominance subcarrier and the vertical sync signal, and for outputting a chrominance control signal, wherein the discrimination control signal corresponds to the broadcasting system and wherein the chrominance control signal comprises first data if the broadcasting system is a first broadcasting system and comprises second data if the broadcasting system is a second broadcasting system; selecting means for selecting a corresponding detecting means based on the discriminating control signal and for inputting a corresponding broadcasting signal from the detecting means, wherein the corresponding detecting means is one of the plurality of detecting means; and chrominance signal adjusting means for varying a gain of a chrominance signal of the corresponding broadcasting signal selected by the selecting means, wherein the chrominance signal adjusting means varies the gain of the chrominance signal according to the chrominance control signal.

Also, a multi-television broadcasting signal control method, which receives a broadcasting signal of a broadcasting system, is provided which includes the steps of: detecting the broadcasting signal according to the broadcasting system; determining the broadcasting system of the broadcasting signal by using at least one of a chrominance subcarrier wave and a vertical sync signal of the broadcasting signal; generating a chrominance control signal, wherein the chrominance control signal comprises first data if the broadcasting system is a first broadcasting system and comprises second data if the broadcasting system is a second broadcasting system; and adjusting a chrominance level of a chrominance signal contained in the broadcasting signal by controlling a gain of the chrominance signal according to the chrominance control signal.

BRIEF DESCRIPTION OF THE DRAWINGS

The above objects and advantages of the present invention will become more apparent by describing in detail preferred embodiment of the present invention with reference to attached drawings in which.

DETAILED DESCRIPTION OF THE INVENTION

Figure 1:
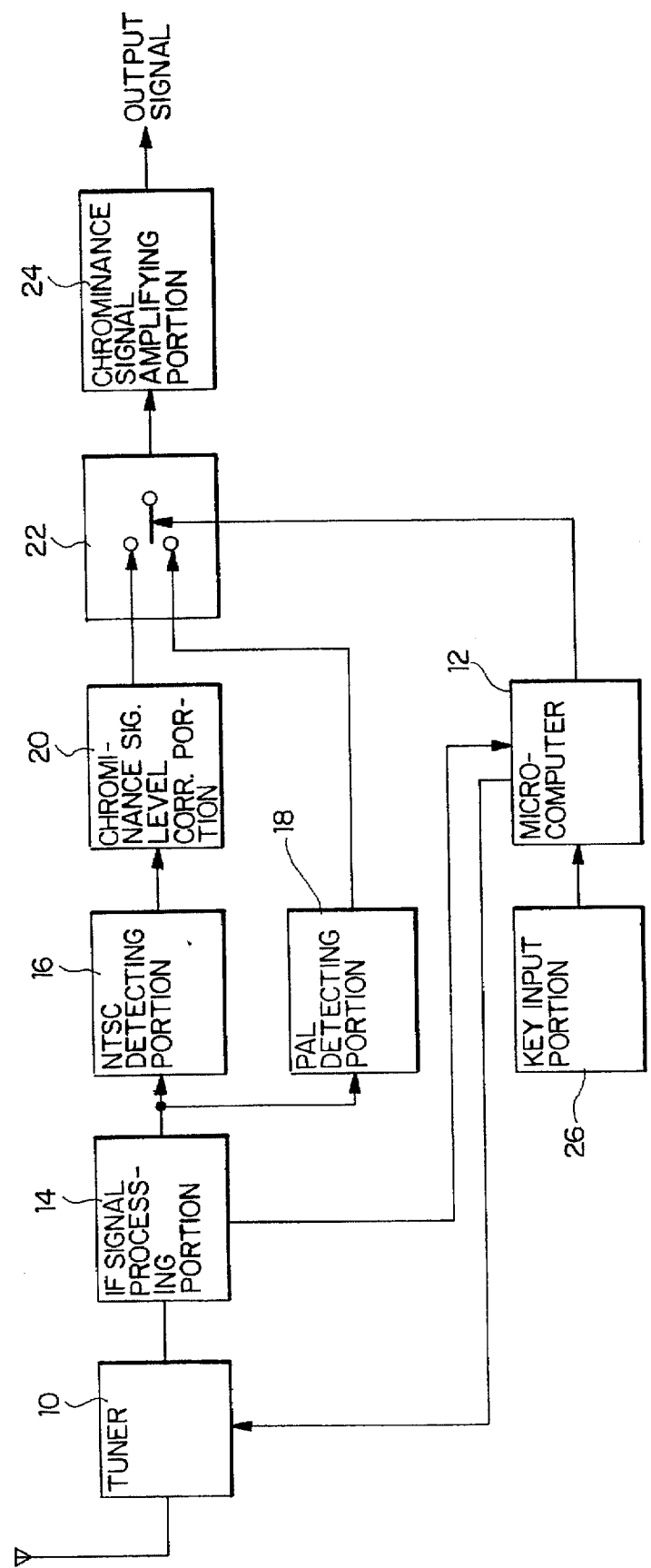
FIG. 1 is a block diagram of a conventional multi-television broadcasting signal receiving apparatus.
Figure 2:
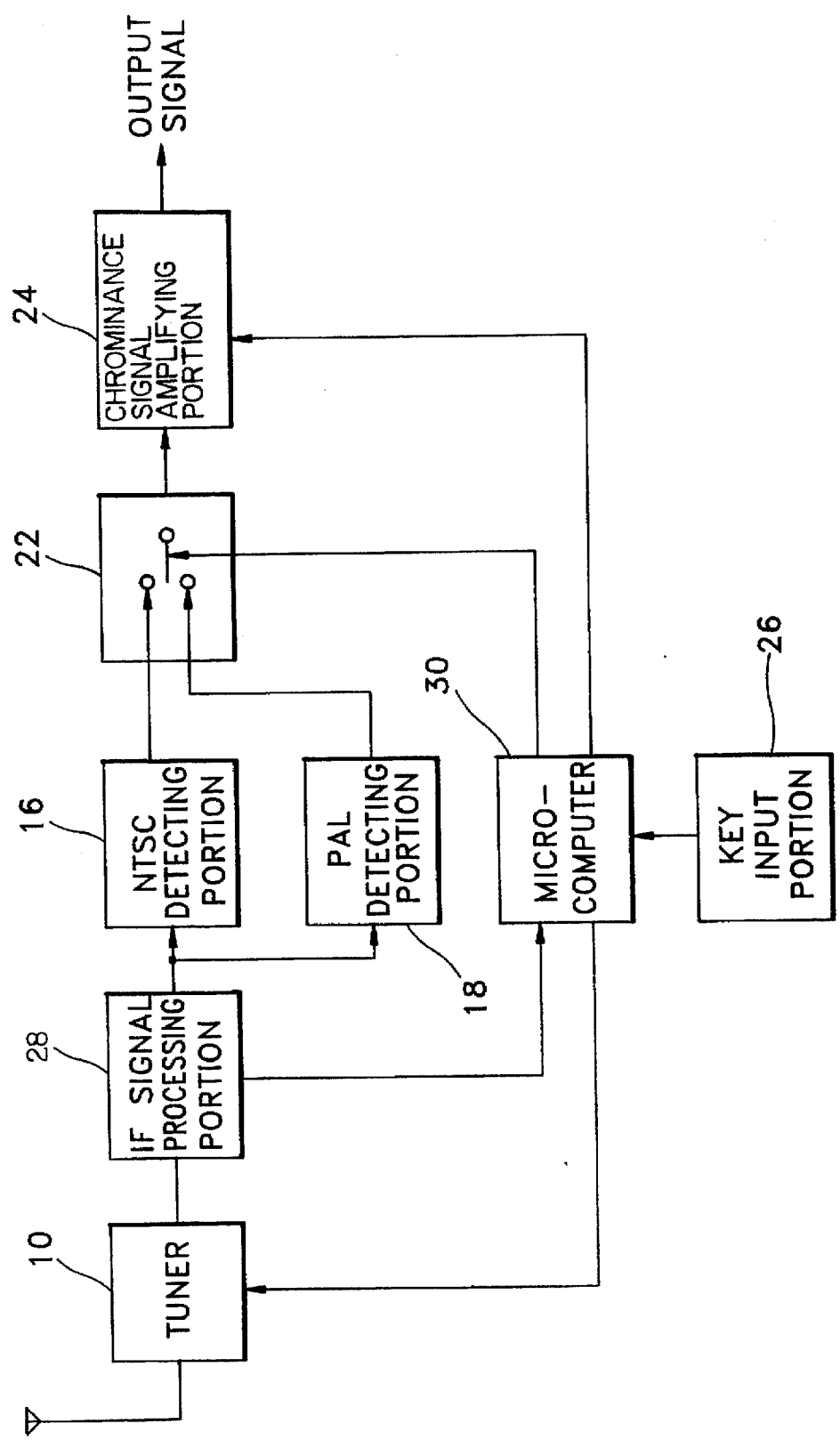
FIG. 2 is a block diagram of a multi-television broadcasting signal receiving apparatus according to an embodiment of the present invention.

FIG. 2 is a block diagram of a multi-television broadcasting signal receiving apparatus according to an embodiment of the present invention. Components illustrated in the figure which are similar to components illustrated in FIG. 1 are designated by the same reference numerals.

As shown in FIG. 2, an aerially transmitted broadcasting signal is supplied to a tuner 10, and the tuner 10 outputs a corresponding IF signal to an IF signal processing portion 28. The IF signal processing portion 28 amplifies the IF signal and supplies the amplified signal to an NTSC detecting portion 16, a PAL detecting portion 18, and a microcomputer 30.

The microcomputer evaluates the IF signal and generates a discrimination control signal based on whether the IF signal is an NTSC signal or a PAL signal. Subsequently, the microcomputer 30 outputs the discrimination control signal to a switch 22.

The NTSC detecting portion 16 and PAL detecting portion 18 are respectively connected to first and second input terminals of the switch 22. The switch 22 selectively inputs either the NTSC signal output from the NTSC detecting portion 16 or the PAL signal output from PAL detecting portion 18 based on the discrimination control signal output from microcomputer 30.

As a result, the switch 22 selectively outputs either the NTSC signal or the PAL signal to a chrominance signal amplifying portion 24. The amplifying portion 24 amplifies the chrominance signal in accordance with a gain control signal supplied from microcomputer 30, and the amplified signal is output to a picture tube (not shown).

An operation of the apparatus shown in FIG. 2 will be explained below. In the apparatus, the IF signal is obtained by mixing the broadcasting signal supplied to tuner 10 with a oscillating signal from a local oscillator (not shown). The oscillating signal has a predetermined frequency which corresponds to a control signal supplied from microcomputer 30. The IF signal is then supplied to the IF signal processing portion 28 which amplifies the signal, and the amplified signal is output to the NTSC detecting portion 16, the PAL detecting portion 18, and the microcomputer 30.

Upon receiving the amplified IF signal, the microcomputer 30 evaluates the vertical sync signal of the IF signal to determine whether the sync signal Corresponds to an NTSC or PAL broadcasting signal. Subsequently, the microcomputer 30 outputs a corresponding control signal to the tuner 10, and the tuner 10 is tuned to a frequency appropriate for receiving either an NTSC broadcasting signal or a PAL broadcasting signal.

When an NTSC broadcasting signal is received, the NTSC detecting portion 16 performs a normal detecting operation. Similarly, when a PAL broadcasting signal is received, the PAL detecting portion 18 performs a normal detecting operation. The signals detected at NTSC and PAL detecting portions 16 and 18 are each supplied to a switch 22. Subsequently, the switch 22 selectively outputs either the NTSC broadcasting signal or the PAL broadcasting signal based on the discriminating control signal supplied from microcomputer 30. For example, if the microcomputer 30 determines that the vertical sync signal supplied from IF signal processing portion 28 corresponds to an NTSC signal, the microcomputer 30 outputs a discrimination control signal which causes the switch 22 to output the NTSC signal to the chrominance signal amplifying portion 28. On the other hand, if the broadcasting signal is a PAL signal, the switch 22 supplies a signal output from PAL detecting portion 18 to chrominance signal amplifying portion 24.

However, the microcomputer 30 does not necessarily have to determine whether the IF signal is an NTSC or a PAL signal based on the vertical sync signal. For instance, the microcomputer 30 may use a chrominance subcarrier for discriminating the type of broadcasting system of the IF signal.

Furthermore, in the present embodiment, the apparatus illustrated in FIG. 2 determines whether the system broadcasting the IF signal is an NTSC or a PAL system. However, the invention is not limited to such determination. For example, it is possible to use both the vertical sync signal and the chrominance subcarrier to discriminate more than two broadcasting systems.

Also, in another embodiment of the present invention, the chrominance subcarriers are detected from the signals output from the NTSC detecting portion 16 and the PAL detecting portion 18, and the vertical sync signal is detected from the signal supplied from the IF signal processing portion 28. Furthermore, a discriminating portion for determining the characteristics of a received broadcasting signal using the chrominance subcarriers and vertical sync signal may also be provided separately.

Upon receiving the output of the switch 22, the chrominance signal amplifying portion 24 adjusts the chrominance level of the broadcasting signal. Furthermore, the amount at which the chrominance level is adjusted is determined according to a chrominance control signal supplied from microcomputer 30. Thus, when the received signal represents a PAL broadcasting system, the microcomputer 30 outputs a chrominance control signal which corresponds to preset gain control data corresponding to a level of the PAL chrominance signal. However, when the received signal represents an NTSC broadcasting system, the microcomputer 30 outputs a chrominance control signal for correcting and amplifying the level of the NTSC chrominance signal. Specifically, the microcomputer 30 generates a chrominance control signal by adding correction data for the NTSC broadcasting system to the preset gain control data corresponding to an NTSC chrominance signal level.

The NTSC correction data, which is data for correcting the chrominance level of the NTSC broadcasting system, is weakly detected in comparison with that of the PAL or SECAM broadcasting system as described above. Furthermore, the preset gain control data, which is previously established based on the level of the chrominance signal of the particular broadcasting system, generally adjusts the level of the chrominance signal.

Figure 3:
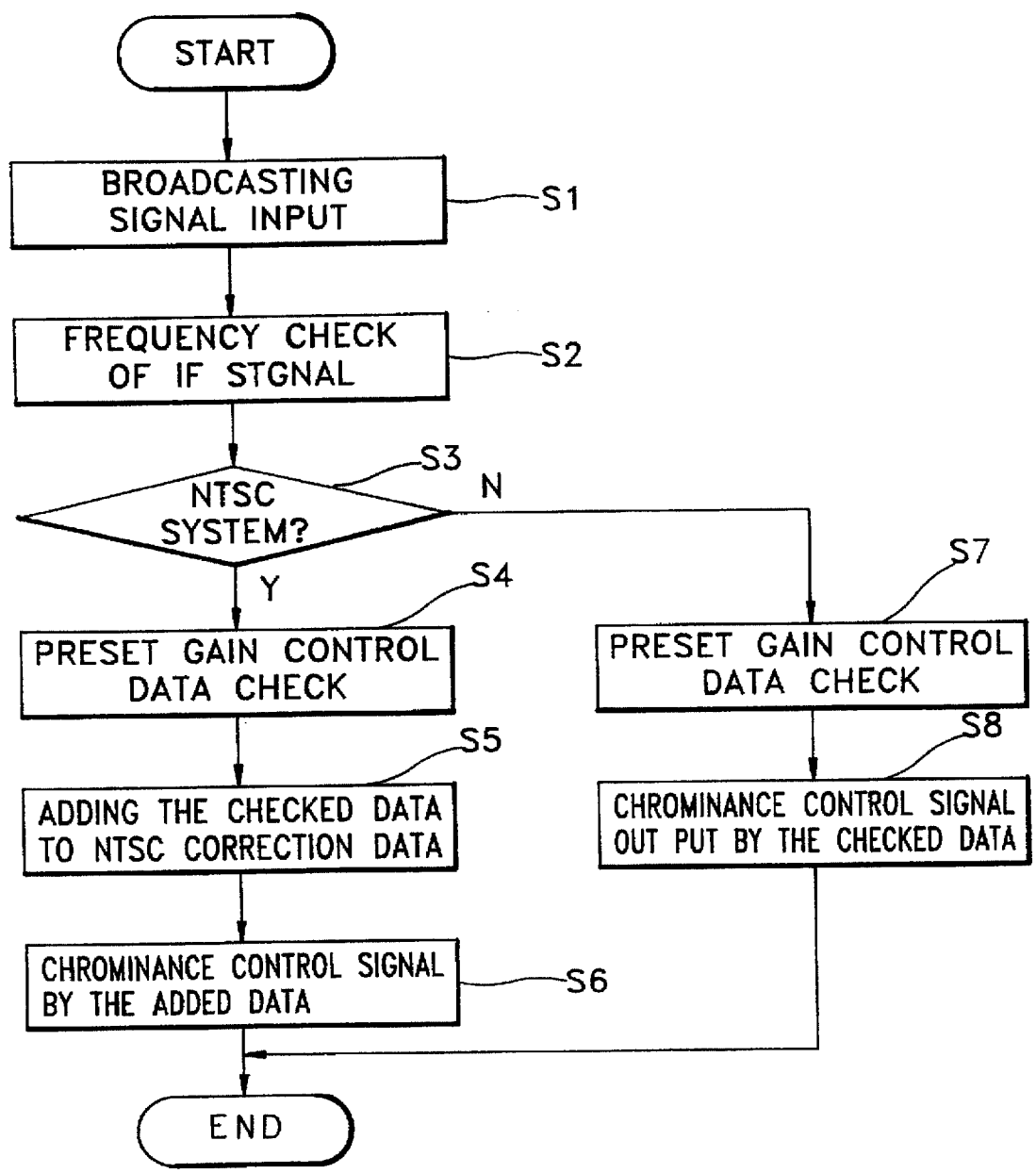
FIG. 3 is a flow chart of a multi-television broadcasting signal receiving control method according to an embodiment of the present invention.

Adjusting the level of the chrominance signal according to the broadcasting system will be explained in detail referring to FIG. 3. First, if a user turns on the multi-television by inputting a command via a key input portion 26 and selects a channel, the broadcasting signal corresponding to the selected channel is input to the microcomputer 30 as an intermediate frequency signal. (Step S1). At this time, the microcomputer 30 determines the type of broadcasting system of the received signal by evaluating the frequency of the vertical sync signal contained in the received broadcasting signal (Step S2), and determines whether or not the IF signal corresponds to the NTSC broadcasting system. (Step S3). At Step S2, the broadcasting system can be determined based on the frequency of the chrominance subcarrier or the frequencies of both the chrominance subcarrier and the vertical sync signal as mentioned above.

If the microcomputer 30 determines that the IF signal is an NTSC broadcasting signal at Step S3, the microcomputer 30 checks the preset gain control data (Step S4). Then, the microcomputer 30 adds the previously programmed correction data for the NTSC signal to the preset gain control data (Step S5) and outputs the chrominance control signal corresponding to the sum of the above data to the chrominance signal amplifying portion 24. (Step S6). Therefore, the chrominance signal amplifying portion 24 amplifies and corrects the chrominance level of the detected NTSC broadcasting signal according to the chrominance control signal.

On the other hand, if microcomputer 30 determines that the IF signal is a PAL signal at Step S3, the microcomputer 30 checks the preset gain control data (Step S7) and outputs a chrominance control signal based on the preset gain control data to the chrominance signal amplifying portion 24. (Step S8). Accordingly, the chrominance level of the detected PAL broadcasting signal is properly amplified in chrominance amplifying portion 24.

Figure 4:
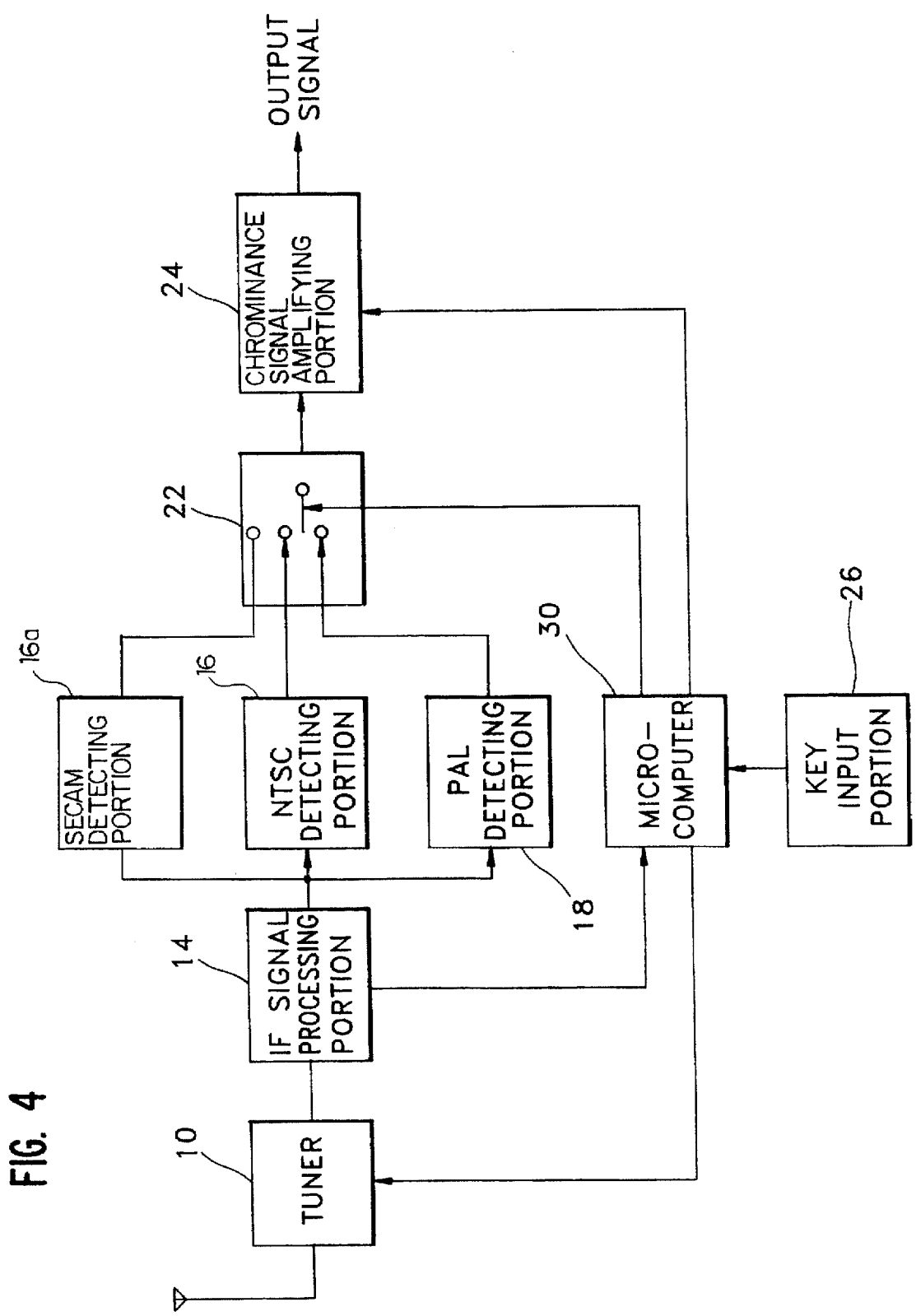
FIG. 4 is a block diagram of a multi-television broadcasting signal receiving apparatus according to another embodiment of the present invention.

Although only the NTSC broadcasting system and the PAL broadcasting system have been explained above, the apparatus may also determine whether a signal has been transmitted via a SECAM broadcasting system. FIG. 4 illustrates a block diagram including a SECAM detection portion 16A for detecting the signal transmitted using the SECAM standard. In addition, the chrominance level of an SECAM broadcasting signal is not substantially different from the chrominance level of a PAL broadcasting signal. Therefore, the gain control of a SECAM broadcasting signal performed by the chrominance signal amplifying portion 24 is similar to the gain control of a PAL broadcasting signal.

As described above, the multi-television of the present invention is capable of receiving several broadcasting signals of the NTSC broadcasting system, the PAL broadcasting system, and the SECAM broadcasting system. Furthermore, the multi-television is capable of automatically correcting a difference of the chrominance level of the signals received via each broadcasting system by programming the gain control data of each broadcasting system in a microcomputer. As a result, a user can properly view a program corresponding to video signals of a plurality of different broadcasting systems.

As described above, the circuitry of the present invention is relatively simple, and thus, the manufacturing cost of the invention can be reduced. Also, the circuitry does not require an extra device for automatically adjusting the chrominance concentration of a broadcasting signal.

What is claimed is:

1. A multi-television broadcasting signal receiving apparatus for processing a tuned signal as an intermediate frequency (IF) signal and determining a broadcasting system of said IF signal based on said IF signal, said apparatus comprising:

a plurality of detecting means for detecting said IF signal by said broadcasting system;

control means for determining said broadcasting system of said IF signal by evaluating at least one of a chrominance subcarrier and a vertical sync signal contained in said IF signal, for outputting a discrimination control signal based on said at least one of said chrominance subcarrier and said vertical sync signal, and for outputting a chrominance control signal, wherein said discrimination control signal corresponds to said broadcasting system and wherein said chrominance control signal comprises first data if said broadcasting system is a first broadcasting system and comprises second data if said broadcasting system is a second broadcasting system;

selecting means for selecting a corresponding detecting means based on said discriminating control signal and for inputting a corresponding broadcasting signal from said corresponding detecting means, wherein said corresponding detecting means is one of said plurality of detecting means; and chrominance signal adjusting means for varying a gain of a chrominance signal of said corresponding broadcasting signal selected by said selecting means, wherein said chrominance signal adjusting means varies said gain of said chrominance signal according to said chrominance control signal.

2. A multi-television broadcasting signal control method, which receives a broadcasting signal of a broadcasting system, said method comprising the steps of:

detecting said broadcasting signal according to said broadcasting system;

determining said broadcasting system of said broadcasting signal by evaluating at least one of a chrominance subcarrier wave and a vertical sync signal of said broadcasting signal;

generating a chrominance control signal in accordance with the result of said determining step, wherein said chrominance control signal comprises first data if said broadcasting system is a first broadcasting system and comprises second data if said broadcasting system is a second broadcasting system; and adjusting a chrominance level of a chrominance signal contained in said broadcasting signal by controlling a gain of said chrominance signal according to said chrominance control signal.

3. The multi-television broadcasting signal receiving apparatus as claimed in claim 1, wherein said first broadcasting system is a broadcasting system in which chrominance correction is necessary, wherein said first data comprises preset gain control data for said first broadcasting system and chrominance correction data, wherein said second broadcasting system is a broadcasting system in which chrominance correction is not necessary, and wherein said second data comprises preset gain control data for said second broadcasting system.

4. The multi-television broadcasting signal receiving apparatus as claimed in claim 3, wherein said first broadcasting system is a National Television System Committee (NTSC) broadcasting system and said second broadcasting system is a Phase Alternating Line (PAL) broadcasting system.

5. The multi-television broadcasting signal receiving apparatus as claimed in claim 3, wherein said first broadcasting system is a National Television System Committee (NTSC) broadcasting system and said second broadcasting system is a Sequential Color with Memory (SECAM) broadcasting system.

6. The multi-television broadcasting signal receiving apparatus as claimed in claim 1, wherein said control means determines said broadcasting system of said IF signal by using said chrominance subcarrier and said vertical sync signal.

7. The multi-television broadcasting signal receiving apparatus as claimed in claim 1, wherein said control means determines said broadcasting system of said IF signal by using only said vertical sync signal.

8. The multi-television broadcasting signal control method as claimed in claim 2, wherein said first broadcasting system is a broadcasting system in which chrominance correction is necessary, wherein said first data comprises preset gain control data for said first broadcasting system and chrominance correction data, wherein said second broadcasting system is a broadcasting system in which chrominance correction is not necessary, and wherein said second data comprises preset gain control data for said second broadcasting system.

9. The multi-television broadcasting signal control method as claimed in claim 8, wherein said first broadcasting system is a National Television System Committee (NTSC) broadcasting system and said second broadcasting system is a Phase Alternating Line (PAL) broadcasting system.

10. The multi-television broadcasting signal control method as claimed in claim 8, wherein said first broadcasting system is a National Television System Committee (NTSC) broadcasting system and said second broadcasting system is a Sequential Color with Memory (SECAM) broadcasting system.

11. The multi-television broadcasting signal control method as claimed in claim 2, wherein said determining step determines said broadcasting system of said broadcasting signal by using said chrominance subcarrier and said vertical sync signal.

12. The multi-television broadcasting signal control method as claimed in claim 2, wherein said determining step determines said broadcasting system of said broadcasting signal by using only said vertical sync signal.

13. A multi-television broadcasting signal receiving apparatus, which receives a broadcasting signal of a broadcasting system, said apparatus comprising:

a first detecting means for detecting and processing said broadcasting signal if said broadcasting signal is a first broadcasting signal and said broadcasting system is a first broadcasting system;

a second detecting means for detecting and processing said broadcasting signal if said broadcasting signal is a second broadcasting signal and said broadcasting system is a second broadcasting system;

control means for determining whether said broadcasting system is said first broadcasting system or said second broadcasting system by evaluating at least one of a chrominance subcarrier and a vertical sync signal contained in said broadcast signal, for outputting a discrimination control signal which corresponds to said broadcasting system, and for outputting a chrominance control signal, wherein said chrominance control signal comprises first data if said broadcasting system is said first broadcasting system and comprises second data if said broadcasting system is said second broadcasting system;

selecting means for selectively inputting one of said first broadcasting signal output by said first detecting means and said second broadcasting signal output by said second detecting means as a selected broadcasting signal according to said discrimination control signal; and chrominance signal adjusting means for varying a gain of a chrominance signal of said selected broadcasting signal according to said chrominance control signal.

14. The multi-television broadcasting signal receiving apparatus as claimed in claim 13, wherein said first broadcasting system is a broadcasting system in which chrominance correction is necessary, wherein said first data comprises preset gain control data for said first broadcasting system and chrominance correction data, wherein said second broadcasting system is a broadcasting system in which chrominance correction is not necessary, and wherein said second data comprises preset gain control data for said second broadcasting system.

15. The multi-television broadcasting signal receiving apparatus as claimed in claim 14,
   wherein said first broadcasting system is a National Television System Committee (NTSC) broadcasting system and said second broadcasting system is a Phase Alternating Line (PAL) broadcasting system.

16. The multi-television broadcasting signal receiving apparatus as claimed in claim 14,
   wherein said first broadcasting system is a National Television System Committee (NTSC) broadcasting system and said second broadcasting system is a Sequential Color with Memory (SECAM) broadcasting system.

17. The multi-television broadcasting signal receiving apparatus as claimed in claim 13,
   wherein said control means determines said broadcasting system of said broadcast signal by using said chrominance subcarrier and said vertical sync signal.

18. The multi-television broadcasting signal receiving apparatus as claimed in claim 13,
   wherein said control means determines said broadcasting system of said broadcast signal by using only said vertical sync signal.

19. The multi-television broadcasting signal receiving apparatus as claimed in claim 15, further comprising:
   a third detecting means for detecting and processing said broadcasting signal if said broadcasting signal is a third broadcasting signal and said broadcasting system is a third broadcasting system, wherein said third broadcasting system is a Sequential Color with Memory (SECAM) broadcasting system, wherein said control means determines whether said broadcasting system is said first broadcasting system, said second broadcasting system, or said third broadcasting system by evaluating said at least one of said chrominance subcarrier and said vertical sync signal contained in said broadcast signal, for outputting said discrimination control signal which corresponds to said broadcasting system, and for outputting said chrominance control signal, wherein said chrominance control signal comprises said first data if said broadcasting system is said first broadcasting system, comprises said second data if said broadcasting system is said second broadcasting system, and comprises third data if said broadcasting system is said third broadcasting system, and wherein said selecting means selectively inputs one of said first broadcasting signal output by said first detecting means, said second broadcasting signal output by said second detecting means, or said third broadcasting signal output by said third detecting means as said selected broadcasting signal.

* * * * *